(12) United States Patent
Takasaki et al.

(10) Patent No.: US 7,014,903 B2
(45) Date of Patent: Mar. 21, 2006

(54) OPTICAL RECORDING MEDIUM (75) Inventors: Hiroshi Takasaki, Tokyo (JP);
Tsutomu Tsutsumi, Tokyo (JP);
Masanori Shibahara, Tokyo (JP);
Hideki Ishizaki, Tokyo (JP)

(73) Assignee: TDK Corporation, Tokyo (JP)

( * ) Notice: Subject to any disclaimer, the term of this patent is extended or adjusted under 35 U.S.C. 154(b) by 3 days.

(21) Appl. No.: 10/794,154

(22) Filed: Mar. 5, 2004

(65) Prior Publication Data

US 2004/0180171 A1 Sep. 16, 2004

(30) Foreign Application Priority Data

Mar. 11, 2003 (JP) ............................. 2003-065474

(51) Int. Cl.
*B32B 3/02* (2006.01)

(52) U.S. Cl. .................... 428/64.1; 428/64.5; 428/64.6; 430/270.13

(58) Field of Classification Search ............... 428/64.1, 428/64.4, 64.5, 64.6; 430/270.13
See application file for complete search history.

(56) References Cited

U.S. PATENT DOCUMENTS

| 6,403,193 B1 * | 6/2002 | Shingai et al. ............. 428/64.1 |
| 6,723,410 B1 * | 4/2004 | Ohno et al. ................ 428/64.1 |
| 6,821,707 B1 * | 11/2004 | Uno et al. ............. 430/270.13 |
| 6,827,999 B1 * | 12/2004 | Ito et al. ..................... 428/64.1 |
| 2003/0161257 A1 * | 8/2003 | Yusu et al. ................. 369/285 |

FOREIGN PATENT DOCUMENTS

JP 2001-209971 8/2001

* cited by examiner

*Primary Examiner*—Elizabeth Mulvaney
(74) *Attorney, Agent, or Firm*—Seed IP Law Group PLLC (57) ABSTRACT

An optical recording medium includes a support substrate, a light transmission layer whose one surface constitutes a light incidence plane through which a laser beam is projected, an information recording layer formed between the support substrate and the light transmission layer, a reflective layer formed between the information recording layer and the support substrate, a water proof layer formed between the reflective layer and the support substrate and containing a mixture of ZnS and $SiO_2$ as a primary component, and a corrosion resistant layer formed between the water proof layer and the reflective layer.

According to the thus constituted optical recording medium, it is possible to effectively prevent a reflective layer from being corroded and has excellent storage reliability.

18 Claims, 3 Drawing Sheets

OPTICAL RECORDING MEDIUM

BACKGROUND OF THE INVENTION

The present invention relates to an optical recording medium and, particularly, to a next-generation type optical recording medium which can effectively prevent a reflective layer from being corroded and has excellent storage reliability.

DESCRIPTION OF THE PRIOR ART

Optical recording media such as the CD, DVD and the like have been widely used as recording media for recording digital data. These optical recording media can be roughly classified into optical recording media such as the CD-ROM and the DVD-ROM that do not enable writing and rewriting of data (ROM type optical recording media), optical recording media such as the CD-R and DVD-R that enable writing but not rewriting of data (write-once type optical recording media), and optical recording media such as the CD-RW and DVD-RW that enable rewriting of data (data rewritable type optical recording media).

On the other hand, a next-generation type optical recording medium that offers improved recording density and has an extremely high data transfer rate has been recently proposed.

In such a next-generation type optical recording medium, the achievement of increased recording capacity and extremely high data transfer rate inevitably requires the diameter of the laser beam spot used to record and reproduce data to be reduced to a very small size.

In order to reduce the laser beam spot diameter, it is necessary to increase the numerical aperture of the objective lens for condensing the laser beam to 0.7 or more, for example, to about 0.85, and to shorten the wavelength of the laser beam to 450 nm or less, for example, to about 400 nm.

In other words, it is necessary to set the ratio λ/NA of the wavelength λ of the laser beam to the numerical aperture NA of the objective lens to be equal to or smaller than 640 nm.

However, if the numerical aperture of the objective lens for condensing the laser beam is increased, then, as shown by Equation (1), the permitted tilt error of the optical axis of the laser beam to the optical recording medium, namely, the tilt margin T, has to be greatly decreased.

$$T \propto \frac{\lambda}{d \cdot NA^3} \quad (1)$$

In Equation (1), λ is the wavelength of the laser beam used for recording and reproducing data and d is the thickness of the light transmission layer through which the laser beam transmits.

As apparent from Equation (1), the tilt margin T decreases as the numerical aperture of the objective lens increases and increases as the thickness of the light transmission layer decreases. Therefore, decrease of the tilt margin T can be effectively prevented by making the thickness of the light transmission layer thinner.

On the other hand, a wave aberration coefficient W representing coma is defined by Equation (2).

$$W = \frac{d \cdot (n^2 - 1) \cdot n^2 \cdot \sin\theta \cdot \cos\theta \cdot (NA)^3}{2\lambda(n^2 - \sin^2\theta)^{\frac{5}{2}}} \quad (2)$$

In Equation (2), n is the refractive index of the light transmission layer and θ is the tilt of the optical axis of the laser beam.

As apparent from Equation (2), coma can also be very effectively suppressed by making the thickness of the light transmission layer thinner.

For these reasons, it has been proposed that the thickness of the light transmission layer of the next-generation type optical recording medium should be reduced as far as about 100 μm in order to ensure sufficient tilt margin and suppress coma.

As a result, it becomes difficult to form a layer such as a recording layer on the light transmission layer as is done in conventional optical recording media such as the CD and DVD. This led to the proposal that the light transmission layer be constituted as a thin resin layer formed by spin coating or the like on a recording layer or other such layer formed on a substrate.

Accordingly, although layers are sequentially formed from the side of the light incidence surface in a conventional optical recording medium, they are sequentially formed from the side opposite from the light incidence surface in a next-generation optical recording medium.

However, in a next-generation optical recording medium whose layers are sequentially formed from the side opposite from the light incidence surface, a reflective layer is apt to be corroded.

More specifically, in a conventional optical recording medium such as the CD and DVD, since layers are sequentially formed from the side of a light transmissible substrate through which a laser beam enters and a reflective layer is last formed, the reflective layer is not in direct contact with the light transmissible substrate. Therefore, even in the case where the light transmissible substrate is formed of a material such as polycarbonate having high water permeability, there is little risk of the reflective layer being corroded by water penetrating through the light transmissible substrate. On the other hand, in a next-generation optical recording medium, since a laser beam enters from the side of a light transmission layer, a reflective layer is formed first, so that the reflective layer is in direct contact with a support substrate. Therefore, in the case where the support substrate is formed of a material such as polycarbonate having high water permeability, the reflective layer is apt to be corroded by water penetrating through the support substrate and the storage reliability of the optical recording medium is lowered.

In order to prevent such corrosion of the reflective layer, it is effective to form a water proof layer of a dielectric material between the support substrate and the reflective layer. However, in the case where the water proof layer contains sulfur (S), the reflective layer is apt to be corroded by the sulfur (S) contained in the water proof layer, thereby lowering the storage reliability of the optical recording medium.

SUMMARY OF THE INVENTION

It is therefore an object of the present invention to provide a next-generation type optical recording medium which can effectively prevent a reflective layer from being corroded and has excellent storage reliability.

The above and other objects of the present invention can be accomplished by an optical recording medium comprising a support substrate, a light transmission layer whose one surface constitutes a light incidence plane through which a laser beam is projected, an information recording layer formed between the support substrate and the light transmission layer, a reflective layer formed between the information recording layer and the support substrate, a water proof layer formed between the reflective layer and the support substrate and containing a mixture of ZnS and $SiO_2$ as a primary component, and a corrosion resistant layer formed between the water proof layer and the reflective layer.

According to the present invention, even in the case where the support substrate has high water permeability, since water passing through the support substrate is blocked by the water proof layer and is reliably prevented from reaching the reflective layer, it is possible to reliably prevent the reflective layer from being corroded by water passing through the support substrate. Therefore, even in the case where the support substrate is formed of polycarbonate resin having relatively high water permeability, it is possible to reliably prevent the reflective layer from being corroded by water passing through the support substrate.

Further, according to the present invention, since the optical recording medium includes the corrosion resistant layer between the water proof layer and the reflective layer, it is possible to effectively prevent sulfur S contained in the water proof layer from reaching the reflective layer and therefore, even in the case where the reflective layer is formed of Ag or alloy containing 95 atomic % or more of Ag, so as to have a high reflection coefficient, it is possible to effectively prevent the reflective layer from being corroded by sulfur S contained in the water proof layer.

Therefore, according to the present invention, it is possible to effectively prevent the reflective layer from being corroded and it is possible to provide an optical recording medium having excellent storage reliability.

In the present invention, the mixture of ZnS and $SiO_2$ for forming the water proof layer preferably contains 95 mole % or more of ZnS and $SiO_2$.

In the present invention, the mole ratio of ZnS to $SiO_2$ in the mixture of ZnS and $SiO_2$ used for forming the water proof layer is preferably 70:30 to 90:10 and more preferably about 80:20.

In the present invention, the water proof layer preferably has a thickness of 40 nm to 200 nm, more preferably has a thickness of 45 nm to 150 nm and particularly preferably has a thickness of 50 nm to 90 nm.

In the present invention, the reflective layer is preferably formed of Ag or an alloy containing Ag as a primary component. Since Ag or an alloy containing Ag as a primary component has a high reflection coefficient, it is possible to form a reflective layer having a high reflection coefficient.

According to the present invention, even in the case where the reflective layer is formed of Ag or an alloy containing Ag as a primary component, since the corrosion resistant layer is formed between the water proof layer and the reflective layer, it is possible to effectively prevent sulfur (S) contained in the water proof layer from reacting with Ag contained in the reflective layer and corroding the reflective layer.

In the present invention, in the case where the reflective layer is formed of an alloy containing Ag as a primary component, it is preferable for the alloy to contain 95 atomic % or more of Ag.

In the present invention, it is preferable to form the corrosion resistant layer of a material containing ZnAl or $CeO_2$ as a primary component and it is more preferable to form the corrosion resistant layer of a material containing ZnAl as a primary component.

In the present invention, the corrosion resistant layer preferably has a thickness of 5 nm to 30 nm and more preferably has a thickness of 10 nm to 20 nm.

In a preferred aspect of the present invention, an optical recording medium is constituted as a data rewritable type optical recording medium and the information recording layer is formed by laminating a first dielectric layer, a recording layer containing a phase change material, a second dielectric layer and a heat radiation layer in this order from the side of the support substrate.

In the present invention, in the case where an optical recording medium is constituted as a data rewritable type optical recording medium, it is preferable for the recording layer to contain a phase change material represented by a general formula: $(Sb_xTe_{1-x})_{1-y}M_y$ where M is an element other than Sb and Te, x is equal to or larger than 0.55 and equal to or smaller than 0.9 and y is equal to or larger than 0 and equal to or smaller than 0.25. Preferably, x is equal to or larger than 0.65 and equal to or smaller than 0.85 and y is equal to or larger than 0 and equal to or smaller than 0.25.

In the present invention, the element M is preferably one or more elements selected from the group consisting of In, Ag, Au, Bi, Se, Al, P, Ge, H, Si, C, V, W, Ta, Zn, Mn, Ti, Sn, Pd, Pb, N, O and rare earth elements. It is particularly preferable for the element M to be one or more elements selected from the group consisting of Ag, In, Ge and rare earth elements for improving the storage reliability of the optical recording medium.

In the present invention, in the case where an optical recording medium is constituted as a data rewritable type optical recording medium, the second dielectric layer is constituted by an interface layer formed of a mixture of ZnS and $SiO_2$ and disposed on the side of recording layer and an enhancing layer formed of a mixture of ZnS and $SiO_2$ and disposed on the side of the heat radiation layer and the interface layer and the enhancing layer are formed so that so that the content of ZnS in the enhancing layer is larger than that in the interface layer and that the content of $SiO_2$ in the interface layer is larger than that in the enhancing layer.

In another preferred embodiment of the present invention, an optical recording medium is constituted as a write-once type optical recording medium and the information recording layer is formed by laminating a second dielectric layer, a second recording film, a first recording film and a first dielectric layer.

In the present invention, in the case where an optical recording medium is constituted as a write-once type optical recording medium, the first recording film contains one element selected from the group consisting of Si, Ge, Sn, Mg, In, Zn, Bi and Al as a primary component and a second recording film contains one element selected from the group consisting of Cu, Al, Zn, Ti and Ag and different from the element contained in the first recording film as a primary component.

In the case where the recording layer is constituted by the first recording film containing one element selected from the group consisting of Si, Ge, Sn, Mg, In, Zn, Bi and Al as a primary component and the second recording film containing one element selected from the group consisting of Cu, Al, Zn, Ti and Ag and different from the element contained in the first recording film as a primary component, when the recording layer is irradiated with a laser beam, the element contained in the first recording film as a primary component and the element contained in the second recording film as a primary component are mixed with each other to form a record mark, thereby recording data in the recording layer.

In the present invention, it is preferable to add at least one element selected from the group consisting of Al, Zn, Sn, Mg and Au and different from the element contained in the second recording film as a primary component to the second recording film.

In the present invention, it is preferable for the first recording film to contain Si as a primary component.

In the present invention, it is preferable for the second recording film to contain Cu as a primary component.

The above and other objects and features of the present invention will become apparent from the following description made with reference to the accompanying drawings.

DESCRIPTION OF THE PREFERRED EMBODIMENTS

Figure 1:
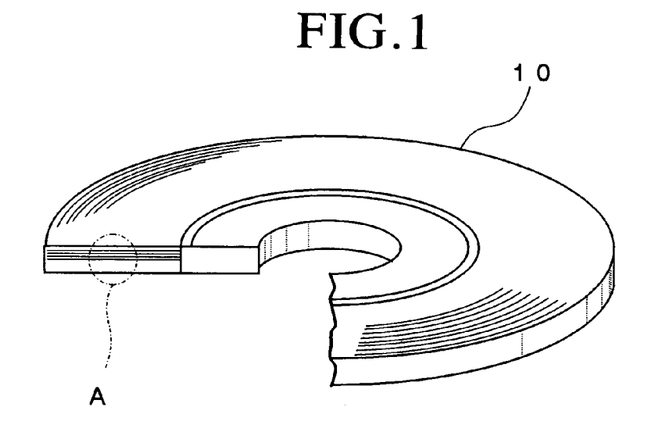
FIG. 1 is a schematic perspective view showing an optical recording medium that is a preferred embodiment of the present invention.
Figure 2:
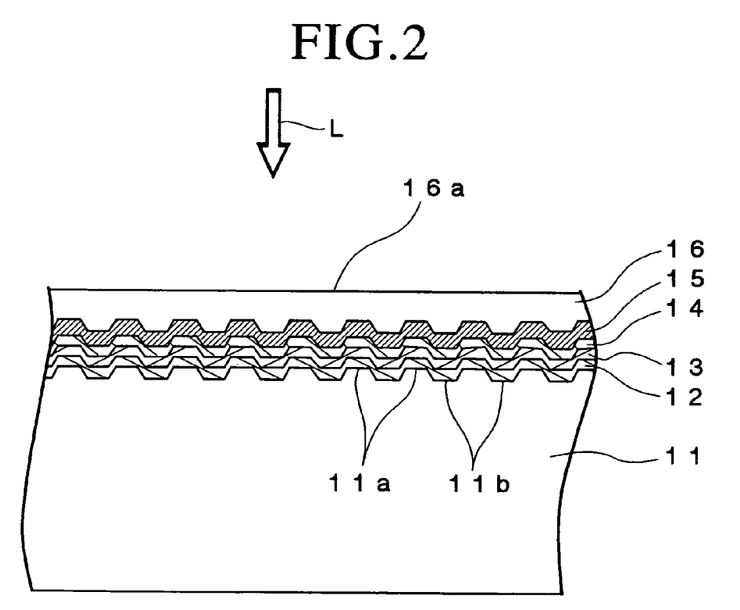
FIG. 2 is an enlarged schematic cross-sectional view of the part of the optical recording medium indicated by A in FIG. 1.

FIG. 1 is a schematic perspective view showing an optical recording medium that is a preferred embodiment of the present invention and FIG. 2 is a schematic enlarged cross-sectional view indicated by A in FIG. 1.

As shown in FIG. 1, an optical recording medium 10 according to this embodiment is formed disk-like and has an outer diameter of about 120 mm and a thickness of about 1.2 mm.

The optical recording medium 10 according to this embodiment is constituted as a data rewritable type optical recording medium and as shown in FIG. 2, the optical recording medium 10 includes a support substrate 11, a water proof layer 12, a corrosion resistant layer 13, a reflective layer 14, an information recording layer 15 and a light transmission layer 16 in this order.

The optical recording medium 10 according to this embodiment is constituted so that a laser beam L having a wavelength λ of 380 nm to 450 nm is projected onto the information recording layer 15 via the light transmission layer 16 and a light incidence plane 16a is formed by the surface of the light transmission layer 16.

When a laser beam L is projected onto the optical recording medium 10, an objective lens having a numerical aperture NA equal to or larger than 0.7, preferably about 0.85, is used. It is preferable to select the wavelength λ of a laser beam L and the numerical aperture NA of the objective lens so that λ/NA is equal to or smaller than 640 nm.

The support substrate 11 serves as a support for ensuring mechanical strength and a thickness of about 1.2 mm required for the optical recording medium 10.

The material used to form the support substrate 11 is not particularly limited insofar as the support substrate 11 can serve as the support of the optical recording medium 10. The support substrate 11 can be formed of glass, ceramic, resin or the like. Among these, resin is preferably used for forming the support substrate 11 since resin can be easily shaped. Illustrative examples of resins suitable for forming the support substrate 11 include polycarbonate resin, polyolefin resin, acrylic resin, epoxy resin, polystyrene resin, polyethylene resin, polypropylene resin, silicone resin, fluoropolymers, acrylonitrile butadiene styrene resin, urethane resin and the like. Among these, polycarbonate resin and polyolefin resin are most preferably used for forming the support substrate 11 from the viewpoint of easy processing, optical characteristics and the like and in this embodiment, the support substrate 11 is formed of polycarbonate resin. In this embodiment, since the laser beam L is projected onto the information recording layer 15 via the light transmission layer 16 located opposite to the support substrate 11, it is unnecessary for the support substrate 11 to have a light transmittance property.

In this embodiment, the support substrate 11 has a thickness of about 1.1 mm.

As shown in FIG. 2, grooves 11a and lands 11b are alternately and spirally formed on the surface of the support substrate 11. The grooves 11a and/or lands 11b serve as a guide track for the laser beam L when data are to be recorded in the optical recording medium 10 or when data are to be reproduced from the optical recording medium 10.

The depth of the groove 11a is not particularly limited and is preferably set to 10 nm to 40 nm. The pitch of the grooves 11a is not particularly limited and is preferably set to 0.2 $\mu$m to 0.4 $\mu$m.

It is preferable to fabricate the support substrate 11 by an injection molding process using a stamper but the support substrate 11 may be fabricated using another process such as a 2P process.

The reflective layer 14 serves to reflect the laser beam L entering through the light incidence plane 16a so as to emit it from the light incidence plane 16a and increase a reproduced signal (C/N ratio) by a multiple interference effect.

The material used to form the reflective layer 14 is not particularly limited insofar as it can reflect a laser beam, and the reflective layer 14 can be formed of Mg, Al, Ti, Cr, Fe, Co, Ni, Cu, Zn, Ge, Ag, Pt, Au or the like. Among these materials, it is preferable to form the reflective layer 14 of Ag or an alloy containing Ag as a primary component since Ag has a high reflection characteristic and high thermal conductivity. In the case where the reflective layer 14 is formed of an alloy containing Ag as a primary component, it is preferable for the alloy to contain 95 atomic % or more of Ag.

It is preferable to form the reflective layer 14 to have a thickness of 20 to 200 nm and is more preferable to form it to have a thickness of 70 to 150 nm.

In the case where the thickness of the reflective layer 14 is thinner than 20 nm, the above described effects cannot sufficiently be obtained. On the other hand, in the case where the thickness of the reflective layer 14 exceeds 200 nm, the surface smoothness of the reflective layer 14 is degraded and it takes a longer time for forming the reflective layer 14, thereby lowering the productivity of the optical recording medium 10.

As described above, in this embodiment, the support substrate 11 is formed of polycarbonate resin, which is excellent in processing ease, optical characteristics and the like. However, since polycarbonate resin has relatively high water permeability, in the case where the reflective layer 14 containing metal is formed so as to be in direct contact with the support substrate 11, there is a risk of the reflective layer 14 being corroded by water passing through the support substrate 11.

Therefore, in this embodiment, the water proof layer 12 and the corrosion resistant layer 13 are provided between the support substrate 11 and the reflective layer 14.

The water proof layer 12 serves to prevent water penetrating through the support substrate 11 from reaching the reflective layer 14 and contains a material having high water impermeability.

$SiO_2$ is a typical material having high water impermeability.

Since minute foreign particles are attached to the surface of the support substrate 11 when the support substrate 11 is fabricated, the surface of the support substrate 11 is formed with minute raised and depressed portions. This makes it necessary for the water proof layer 12 to have a thickness sufficient for covering the minute raised and depressed portions and the water proof layer therefore preferably has a thickness equal to or thicker than 30 nm.

However, since the membrane stress of $SiO_2$ is extremely high, in the case where a water proof layer 12 is formed of $SiO_2$ so as to have a thickness equal to or thicker than 30 nm, cracks tend to be generated in the water proof layer 12 and the layer cannot serve as a water proof layer 12.

Therefore, in this embodiment, the water proof layer 12 is formed using a mixture of $SiO_2$ and ZnS and, specifically, the water proof layer 12 is formed of a mixture containing 95 mol % or more of the mixture of $SiO_2$ and ZnS. Although the mixture of $SiO_2$ and ZnS has poorer water impermeability than that of $SiO_2$ at the same thickness, the membrane stress thereof is much lower than that of $SiO_2$, even when the water proof layer 12 is formed to greater thickness, there is little risk of cracks being generated. Therefore, it is possible to form a water proof layer 12 having an excellent water proof characteristic by forming it of the mixture of $SiO_2$ and ZnS.

The mole ratio of ZnS to $SiO_2$ in the mixture is not particularly limited but the mole ratio of ZnS to $SiO_2$ is preferably 70:30 to 90:10 and most preferably about 80:20 from the viewpoint of balance between the water impermeability and the membrane stress thereof In the case where the mole ratio of $SiO_2$ in the mixture of $SiO_2$ and ZnS exceeds 30 mole %, the membrane stress of the mixture of $SiO_2$ and ZnS becomes high to the point that when the water proof layer 12 is formed so as to have a thickness sufficient for covering the minute raised and depressed portions formed on the surface of the support substrate 11, cracks are liable to occur in the water proof layer 12. On the other hand, in the case where the mole ratio of $SiO_2$ in the mixture of $SiO_2$ and ZnS is less than 10 mole %, there is a risk of the water impermeability of the water proof layer 12 becoming insufficient.

As pointed out above, it is necessary to form a water proof layer 12 so as to cover the minute raised and depressed portions formed on the surface of the support substrate 11, in other words, to have a thickness equal to or thicker than 30 nm. However, when the water proof layer 12 is too thick, there is a risk of cracks being generated in the water proof layer 12 due to the membrane stress thereof. Therefore, the water proof layer 12 is preferably formed to have a thickness of 40 nm to 200 nm, more preferably 45 nm to 150 nm and particularly preferably 50 nm to 90 nm.

The corrosion resistant layer 13 serves to prevent the reflective layer 12 from being corroded by sulfur S contained in the water proof layer 12.

Since the water proof layer 12 contains sulfur (S), in the case where the water proof layer 12 and the reflective layer 14 are in direct contact with each other, sulfur (S) contained in the water proof layer 12 reacts with the metal contained in the reflective layer 14, thereby posing a risk of the reflective layer 14 being corroded. In particular, in the case where the reflective layer 14 is formed of Ag or an alloy containing Ag as a primary component, there is a high risk of sulfur (S) contained in the water proof layer 12 reacting with Ag contained in the reflective layer 14 and corrosion of the reflective layer occurring.

The corrosion resistant layer 13 therefore has a function of preventing sulfur (S) contained in the water proof layer 12 from reaching the reflective layer 14 and is preferably formed of a dielectric material. On the other hand, since the corrosion resistant layer 13 is provided between the water proof layer 12 and the reflective layer 14, it is preferable to form the corrosion resistant layer 13 of a material having excellent adhesiveness with the water proof layer 12 and the reflective layer 14. Therefore, the corrosion resistant layer 13 is preferably formed of a material containing 95 mole % or more of ZnAl or $CeO_2$. Since Zn contained in ZnAl serves to capture loose sulfur S, it is particularly preferable to form the corrosion resistant layer 13 of a material containing 95 mole % or more of ZnAl. In the case where the corrosion resistant layer 13 is formed of a material containing 95 mole % or more of ZnAl, the corrosion resistant layer 13 can be formed at a high film forming rate using the sputtering process, and this, plus the fact that ZnAl is inexpensive, makes it possible to lower the cost of manufacturing the optical recording medium 10.

The thickness of the corrosion resistant layer 13 is not particularly limited but the corrosion resistant layer 13 is preferably formed so as to have a thickness equal to or thicker than 5 nm in order to reliably prevent the reflective layer 14 from being corroded. However, when the thickness of the corrosion resistant layer 13 exceeds a certain value, further increase in the thickness of the corrosion resistant layer 13 does not much improve the corrosion preventing effect of the reflective layer 13, while, on the other hand, when the corrosion resistant layer 13 is too thick, the surface smoothness of the corrosion resistant layer 13 becomes worse and the noise level of a reproduced signal increases. Therefore, it is preferable to form the corrosion resistant layer 13 so as to have a thickness of 5 nm to 30 nm and more preferably to form it so as to have a thickness of 10 nm to 20 nm.

Figure 3:
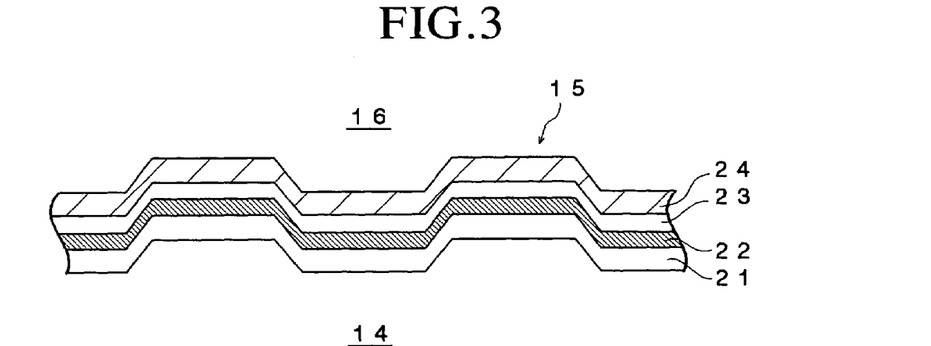
FIG. 3 is a schematic cross-sectional view showing an information recording layer of an optical recording medium which is a preferred embodiment of the present invention.

FIG. 3 is a schematic cross-sectional view showing the information recording layer 15 of the optical recording medium 10 which is a preferred embodiment of the present invention.

In this embodiment, the optical recording medium 10 is constituted as a data rewritable type optical recording medium and as shown in FIG. 3, the information recording layer 15 is formed by laminating a first dielectric layer 21, a recording layer 22, a second dielectric layer 23 and a heat radiation layer 24 in this order from the side of the support substrate 11.

The recording layer 22 is a layer in which record marks are to be formed, whereby data are recorded. The recording layer 22 is formed of a phase change material.

The reflection coefficients of the phase change material are different between the case where the phase change material is in a crystal phase and the case where it is in an amorphous phase, and data are recorded utilizing this characteristic of the phase change material.

When the laser beam L is projected onto the recording layer 22, whereby the phase of a region of the recording layer 22 is changed from a crystal phase to an amorphous phase to form a record mark, the laser beam L set to the recording power Pw is projected onto the recording layer 22 via the light transmission layer 16 to heat the region of the recording layer 22 irradiated with the laser beam L to a temperature equal to or higher than the melting point of the phase change material, thereby melting it and the laser beam L set to the bottom power Pb lower than the recording power Pw is then projected onto the recording layer 22, thereby quickly cooling the melted region of the recording layer 22 to change the phase thereof to an amorphous phase. Thus, a record mark is formed at the region of the recording layer 22 whose phase is in an amorphous phase.

On the other hand, when the region of the recording layer 22 in an amorphous phase is crystallized, thereby erasing the record mark, the laser beam L set to the erasing power Pe equal to or higher than the bottom power Pb is projected onto the recording layer 22 via the light transmission layer 16 to heat the region of the recording layer 22 to a temperature equal to or higher than the crystallization temperature of the phase change material and the region of the recording layer 22 is gradually cooled by moving the laser beam L away therefrom. Thus, the region of the recording layer 22 is crystallized and the record mark is erased.

Therefore, it is possible by modulating the power of the laser beam L projected onto the recording layer 22 to form a record mark in the recording layer 22 and directly overwrite a record mark formed in the region of the recording layer 22.

The phase change material usable for forming the recording layer 22 is not particularly limited but in order to enable data to be overwritten in the recording layer 22 at a high velocity, it is preferable to form the recording layer 22 using a phase change material which changes from an amorphous phase to a crystal phase in a short time, in other words, has a short crystallizing time.

Illustrative examples of materials having such a characteristic include a SbTe system material. As the SbTe system material, SbTe may be used alone or a SbTe system material to which additives are added in order to shorten time required for crystallization and improve the long-term storage reliability of the optical recording medium 10 may be used.

Since as the surface smoothness of the recording layer becomes worse the recording layer 22 becomes thicker, the recording sensitivity decreases and the noise level of a reproduced signal increases. Therefore, it is preferable to form the recording layer 22 to be thin. However, when the recording layer 22 is too thin, the difference in the optical constants between before and after data recording becomes small and a reproduced signal having a high level (C/N ratio) cannot be obtained. When the recording layer 22 is too thin, it is difficult to control the thickness of the recording layer 22 when it is formed. Therefore, the recording layer 22 is preferably formed to have a thickness of 2 to 40 nm, more preferably, to have a thickness of 4 to 20 nm and most preferably to have a thickness of about 12 nm.

The first dielectric layer 21 and the second dielectric layer 23 and the heat radiation layer 23 serve to physically and chemically protect the recording layer 22 and to increase the difference in the optical characteristics between before and after data recording. It is possible to effectively prevent data recorded in the recording layer 22 from being degraded for a long time by sandwiching the recording layer 22 by the first dielectric layer 21 and the second dielectric layer 23. In addition, the heat radiation layer 24 serves to quickly radiate heat generated in the recording layer 22.

The material for forming the first dielectric layer 21 and the second dielectric layer 23 is not particularly limited insofar as it is transparent in the wavelength range of the laser beam L and the first dielectric layer 21 and the second dielectric layer 23 can be formed of an oxide, sulfide, nitride or carbide of Al, Si, Ce, Ti, Zn, Ta or the like, such as ZnO, ZnS, GeN, GeCrN, $CeO_2$, SiO, $SiO_2$, $Si_3N_4$, $La_2O_3$, TaO, $TiO_2$, SiAlON (mixture of $SiO_2$, $Al_2O_3$, $Si_3N_4$ and AlN), LaSiON (mixture of $La_2O_3$, $SiO_2$ and $Si_3N_4$) or the like, or a mixture thereof. However, since the first dielectric layer 21 is in contact with the reflective layer 14, the first dielectric layer is preferably free of sulfur S.

The first dielectric layer 21 is formed so as to have preferably a thickness of 5 nm to 20 nm, more preferably 10 nm to 15 nm and particularly preferably about 12 nm. In the case where the thickness of the first dielectric layer 21 is thinner than 5 nm, the recording layer 22 cannot be protected in a desired manner. On the other hand, in the case where the thickness of the first dielectric layer 21 exceeds 20 nm, there is a risk of cracks being generated in the first dielectric layer 21 and the heat radiation characteristic of the first dielectric layer 21 is lowered.

To the contrary, although not shown in FIG. 3, the second dielectric layer 23 is preferably constituted by an interface layer made of a material having relatively good physical properties and an enhancing layer made of a material having relatively good optical properties. If the second dielectric layer 23 is constituted so that the interface layer having relatively good physical properties is disposed on the side of the recording layer 22 and that the enhancing layer having relatively good optical properties on the side of the heat radiation layer 24, it is possible to ensure high reliability of repeated overwriting of data and improve the optical characteristics of the optical recording medium 10.

It is preferable to form each of the interface layer and the enhancing layer of a mixture of ZnS and $SiO_2$ and it is particularly preferable to form the interface layer and the enhancing layer so that the content of ZnS in the enhancing layer is larger than that in the interface layer and that the content of $SiO_2$ in the interface layer is larger than that in the enhancing layer.

The thickness of the second dielectric layer 23 is not particularly limited but the second dielectric layer 23 is preferably formed so as to have a thickness of 10 nm to 50 nm and particularly preferably formed so as to have a thickness of about 30 nm. In the case where the thickness of the second dielectric layer 23 is thinner than 10 nm, it becomes difficult to protect the recording layer 22 in a desired manner and to sufficiently increase the difference in optical properties of the optical recording medium 10 between before and after data recording. On the other hand, in the case where the thickness of the second dielectric layer 23 exceeds 50 nm, it takes a long time to form the second dielectric layer 23, thereby lowering the productivity of the optical recording medium 10, and cracks may be generated in the optical recording medium 10 owing to stress present in the second dielectric layer 23. Furthermore, in the case where the thickness of the second dielectric layer 23 exceeds 50 nm, the heat radiation characteristic of the heat radiation layer 24 decreases.

Further, the second dielectric layer 23 is preferably formed so that the thickness of the enhancing layer is larger than that of the interface layer. More specifically, in the case where the interface layer is formed of a mixture of ZnS and $SiO_2$ whose mole ratio is 50:50 and that the enhancing layer is formed of a mixture of ZnS and $SiO_2$ whose mole ratio is 80:20, it is preferable to form the interface layer so as to have a thickness of 1 nm to 10 nm and the enhancing layer so as to have a thickness of 10 nm to 40 nm and it is particularly preferable to form the interface layer so as to have a thickness of about 5 nm and the enhancing layer so as to have a thickness of about 25 nm. Since the mixture of ZnS and $SiO_2$ whose mole ratio is 50:50 has relatively high membrane stress and relatively low thermal conductivity, if the interface layer is too thick, cracks are apt to be generated in the second dielectric layer 23 and the heat radiation effect of the heat radiation layer 24 decreases.

The material usable for forming the heat radiation layer 24 is not particularly limited insofar as it is transparent in the wavelength range of the laser beam and it has higher thermal conductivity than that of the material used for forming the second dielectric layer 23 and, similarly to the second dielectric layer 23, the heat radiation layer 24 can be formed of an oxide, sulfide, nitride or carbide of Al, Si, Ce, Ti, Zn, Ta or the like, or the mixture thereof. In the case where the second dielectric layer 23 is formed of a mixture of ZnS and $SiO_2$, it is preferable to form the heat radiation layer 24 of $Al_2O_3$. Since the thermal conductivity of $Al_2O_3$ is higher than that of the mixture of ZnS and $SiO_2$, in the case where the heat radiation layer 24 is formed of $Al_2O_3$, the heat radiation characteristic of the optical recording medium 10 between the light incidence plane 16a and the recording layer 22 can be effectively improved, making it is possible to reduce cross-talk and prevent data from being degraded by reproduction.

The thickness of the heat radiation layer 24 is not particularly limited but when the heat radiation layer 24 is formed of $Al_2O_3$, it is preferable to form the heat radiation layer 24 so as to have a thickness of 15 nm to 40 nm and more preferably to form it so as to have a thickness of about 30 nm. In the case where the thickness of the heat radiation layer 24 formed of $Al_2O_3$ is thinner than 15 nm, the heat radiation characteristic of the heat radiation layer 24 becomes insufficient and, on the other hand, in the case where the thickness of the heat radiation layer 24 formed of $Al_2O_3$ exceeds 40 nm, it takes a long time to form the heat radiation layer 24, thereby lowering the productivity of the optical recording medium 10, and cracks may be generated in the optical recording medium 10 owing to stress present in the heat radiation layer 24.

Each of the water proof layer 12, the corrosion resistant layer 13, the reflective layer 14 and the respective layers of the information recording layer 15 can be formed by a vapor growth process using chemical species containing elements for forming it. Illustrative examples of the vapor growth processes include a sputtering process, vacuum deposition process and the like and the sputtering process is preferably used for forming them.

The light transmission layer 16 serves to transmit the laser beam L and the light incidence plane 16a is constituted by the surface thereof It is preferable to form the light transmission layer 16 to have a thickness of 10 μm to 300 μm and is more preferable to form the light transmission layer 16 to have a thickness of 50 μm to 150 μm.

The material usable for forming the light transmission layer 16 is not particularly limited insofar as it has a sufficiently high light transmittance with respect to the laser beam L but it is preferable to form the light transmission layer 16 by applying acrylic ultraviolet ray curable resin or epoxy ultraviolet ray curable resin onto the surface of the information recording layer 15 using a spin coating process.

The light transmission layer 16 may be formed by adhering a sheet made of light transmittable resin to the surface of the information recording layer 15 using an adhesive agent.

In this embodiment, since the water proof layer 12 is formed of a mixture of ZnS and $SiO_2$ so as to be in contact with the support substrate 11, it is possible to effectively prevent water from reaching the reflective layer 14, whereby it is possible to effectively prevent the reflective layer 14 from being corroded by water passing through the support substrate 11. Further, in this embodiment, since the corrosion resistant layer 13 is formed between the water proof layer 12 and the reflective layer 14, it is possible to effectively prevent the metal contained in the reflective layer 14 from being sulfurized and corroded by sulfur (S) contained in the water proof layer 12. Therefore, according to this embodiment, even in the case of forming the support substrate 11 of polycarbonate resin having excellent workability, optical properties and the like but relatively high water permeability and forming the reflective layer 14 of Ag having a high reflection coefficient and high thermal conductivity or an alloy containing Ag as a primary component, since it is possible to effectively prevent the reflective layer 14 from being corroded, it is possible to markedly improve the storage reliability of the optical recording medium 10.

Figure 4:
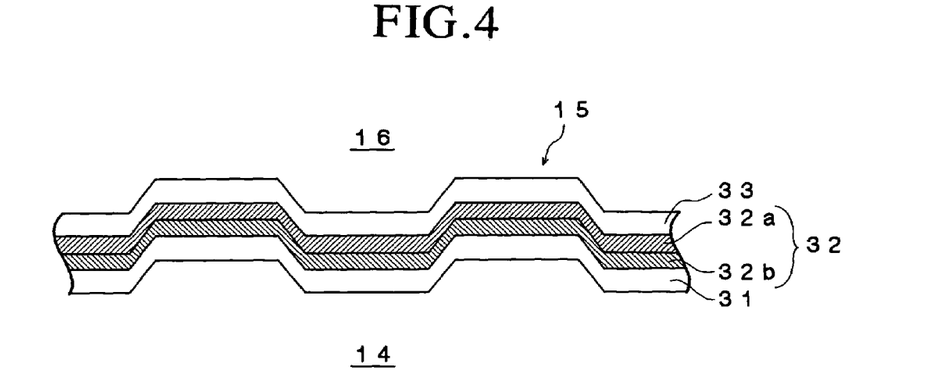
FIG. 4 is a schematic cross-sectional view showing an information recording layer of an optical recording medium which is another preferred embodiment of the present invention.

FIG. 4 is a schematic cross-sectional view showing an information recording layer of an optical recording medium which is another preferred embodiment of the present invention.

In this embodiment, an optical recording medium 10 is constituted as a write-once type optical recording medium and has the same configuration as that of the optical recording medium 10 shown in FIG. 1, except for the configuration of the information recording layer 15.

The optical recording medium 10 according to this embodiment is constituted so that a laser beam L having a wavelength λ of 380 nm to 450 nm is projected onto the information recording layer 15 via the light transmission layer 16 and a light incidence plane 16a is formed by the surface of the light transmission layer 16.

When a laser beam L is projected onto the optical recording medium 10, an objective lens having a numerical aperture NA equal to or larger than 0.7, preferably about 0.85 is used. It is preferable to select the wavelength λ of a laser beam L and the numerical aperture NA of an objective lens so that λ/NA is equal to or smaller than 640 nm.

As shown in FIG. 4, the information recording layer 15 of the optical recording medium 10 according to this embodiment is constituted by laminating a second dielectric layer 31, a recording layer 32 and a first dielectric layer 33.

The recording layer 32 is a layer in which record marks are to be formed, whereby data are recorded and as shown in FIG. 4, the recording layer 32 is constituted by laminating a first recording film 32a and a second recording film 32b.

As shown in FIG. 4, in this embodiment, the first recording film 32a is disposed on the side of the light transmission layer 16 and the second recording film 32b is disposed on the side of the substrate 11.

In this embodiment, the first recording film 31 contains Si as a primary component and the second recording film 32 contains Cu as a primary component.

In order to lower the noise level of a reproduced signal and improve the storage reliability of the optical recording medium 10, it is preferable to add one or more elements selected from the group consisting of Al, Zn, Sn, Mg and Au to the second recording film 32b.

Figure 5:
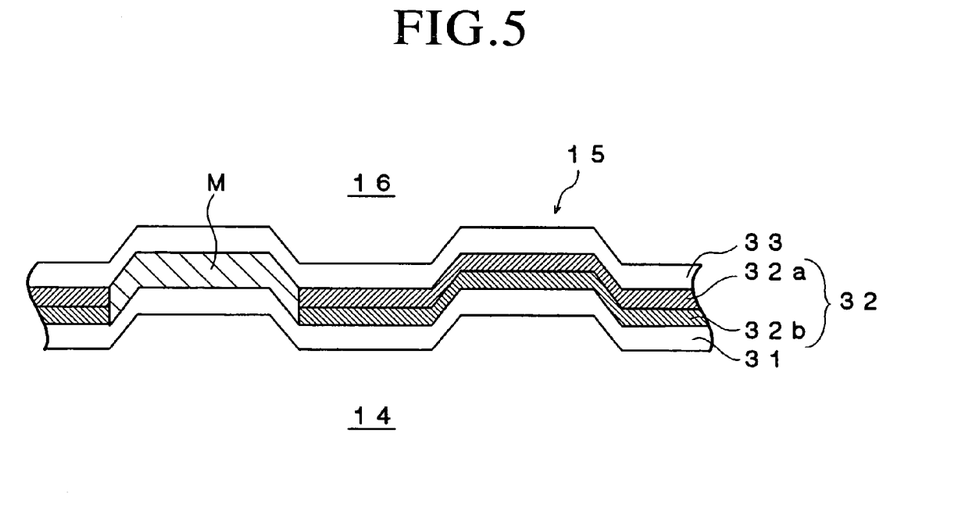
FIG. 5 is a schematic enlarged cross-sectional view showing an optical recording medium shown in FIG. 4 after a recording layer was irradiated with a laser beam.

FIG. 5 is a schematic enlarged cross-sectional view showing the optical recording medium 10 shown in FIG. 1 after the recording layer 32 was irradiated with a laser beam L.

As shown in FIG. 54, when the recording 33 of the optical recording medium 10 is irradiated with a laser beam L via a light incident plane 16a, Si contained in the first recording film 32a as a primary component and Cu contained in the second recording film 32b as a primary component are quickly fused or diffused and a region M where Si and Cu are mixed is formed, thereby forming a record mark M.

As shown in FIG. 5, when Si contained in the first recording film 32a as a primary component and Cu contained in the second recording film 32b as a primary component are mixed to form a record mark M, the reflection coefficient of a region where the record mark has been formed greatly changes. Therefore, since the reflection coefficient of the region where the record mark is formed is greatly different from that of the region of the recording layer 32 surrounding the region where the record mark M is formed, it is possible to obtain a high reproduced signal (C/N ratio) by reproducing data recorded in the recording layer 32.

The surface smoothness of the first recording film 32a irradiated with the laser beam L becomes worse as the total thickness of the first recording film 32a and the second recording film 32b becomes thicker. As a result, the noise level of the reproduced signal becomes higher and the recording sensitivity is lowered. On the other hand, in the case where the total thickness of the first recording film 32a and the second recording film 32b is too small, the change in reflection coefficient between before and after irradiation with the laser beam L is small, so that a reproduced signal having high strength (C/N ratio) cannot be obtained. Moreover, it becomes difficult to control the thickness of the first recording film 32a and the second recording film 32b.

Therefore, it is preferable to form the first recording film 32a and the second recording film 32b so that the total thickness of the first recording film 32a and the second recording film 32b, namely, the thickness of the recording layer 32 is equal to or thicker than 2 nm and equal to or thinner than 20 nm and it is more preferable to form the first recording film 32a and the second recording film 32b so that the total thickness of the first recording film 32a and the second recording film 32b is equal to or thicker than 2 nm and equal to or thinner than 15 nm.

The first dielectric layer 33 and the second dielectric layer 31 serve to physically and chemically protect the recording layer 32. It is possible to effectively prevent data recorded in the recording layer 32 from being. degraded for a long time by sandwiching the recording layer 32 by the first dielectric layer 33 and the second dielectric layer 31.

The first dielectric layer 33 and the second dielectric layer 31 can be formed of the material usable for forming the first dielectric layer 21 and the second dielectric layer 23 of the optical recording medium 10 shown in FIGS. 1 and 2. However, the second dielectric layer 33 is preferably free of sulfur (S) since it is in contact with the reflective layer 14.

The thickness of the first dielectric layer 33 and the second dielectric layer 31 is not particularly limited but is preferably from 3 nm to 200 nm. In the case where the first dielectric layer 33 or the second dielectric layer 31 is thinner than 3 nm, it is difficult to obtain the above-described advantages. On the other hand, in the case where the first dielectric layer 33 or the second dielectric layer 31 is thicker than 200 nm, it takes a long time to form the first dielectric layers 33 or the second dielectric layers 31, thereby lowering the productivity of the optical recording medium 10, and cracks may be generated in the optical recording medium 10 owing to stress present in the first dielectric layers 33 and/or the second dielectric layer 31.

Each of the second dielectric layer 31, the second recording film 32b, the first recording film 32a and the first dielectric layer 33 can be formed by a vapor growth process using chemical species containing elements for forming it. Illustrative examples of the vapor growth processes include a sputtering process, vacuum deposition process and the like and the sputtering process is preferably used for forming them.

In this embodiment, since the water proof layer 12 is formed of a mixture of ZnS and $SiO_2$ so as to be in contact with the support substrate 11, it is possible to effectively prevent water from reaching the reflective layer 14, whereby it is possible to effectively prevent the reflective layer 14 from being corroded by water passing through the support substrate 11. Further, in this embodiment, since the corrosion resistant layer 13 is formed between the water proof layer 12 and the reflective layer 14, it is possible to effectively prevent the metal contained in the reflective layer 14 from being sulfurized and corroded by sulfur (S) contained in the water proof layer 12. Therefore, according to this embodiment, even in the case of forming the support substrate 11 of polycarbonate resin having excellent workability, optical properties and the like but relatively high water permeability and forming the reflective layer 14 of Ag having a high reflection coefficient and high thermal conductivity or an alloy containing Ag as a primary component, since it is possible to effectively prevent the reflective layer 14 from being corroded, it is possible to markedly improve the storage reliability of the optical recording medium 10.

WORKING EXAMPLES AND COMPARATIVE EXAMPLES

Hereinafter, a working example will be set out in order to further clarify the advantages of the present invention.

Working Example

An optical recording medium sample # 1 was fabricated in the following manner.

A substrate of polycarbonate having a thickness of 1.1 mm and a diameter of 120 mm and formed with grooves and lands on the surface thereof was first fabricated by an injection molding process so that the track pitch (groove pitch) was equal to 0.32 $\mu$m. The depth of the groove was 25 nm.

Then, the substrate was set on a sputtering apparatus and a water proof layer consisting of a mixture of ZnS and $SiO_2$ and having a thickness of 50 nm, a corrosion resistant layer consisting of ZnAl and having a thickness of 10 nm, a reflective layer consisting of an alloy of Ag, Pd and Cu and having a thickness of 100 nm, a first dielectric layer consisting of $CeO_2$ and having a thickness of 12 nm, a recording layer consisting of SbTeGeAg and having a thickness of 12 nm, a second dielectric layer including an interface layer consisting of a mixture of ZnS and $SiO_2$ and having a thickness of 5 nm and an enhancing layer consisting of a mixture of ZnS and $SiO_2$ and having a thickness of 25 nm, and a heat radiation layer consisting of $Al_2O_3$ and having a thickness of 30 nm were sequentially formed on the surface of the substrate on which the grooves and lands were formed, using the sputtering process.

The mole ratio of ZnS to $SiO_2$ in the mixture of ZnS and $SiO_2$ contained in the water proof layer and the enhancing layer was 80:20 and the mole ratio of ZnS to $SiO_2$ in the mixture of ZnS and $SiO_2$ contained in the interface layer was 50:50.

Further, the atomic ratio of SbTeGeAg constituting the recording layer was 74:20:5:1.

Then, the support substrate formed with the water proof layer, the corrosion resistant layer, the reflective layer, the first dielectric layer, the recording layer, the second dielectric layer and the heat radiation layer on the surface thereof was set in a spin coating apparatus and the heat radiation layer was coated with a resin solution prepared by dissolving acrylic ultraviolet ray curable resin in a solvent to form a coating layer and the coating layer was irradiated with ultraviolet rays, thereby curing the acrylic ultraviolet ray curable resin to form a light transmission layer having a thickness of 100 µm.

Thus, an optical recording medium sample #1 was fabricated.

Then, an optical recording medium sample #2 was fabricated in the manner of fabricating the optical recording medium sample #1 except that a corrosion resistant layer having a thickness of 20 nm was formed.

Further, an optical recording medium sample #3 was fabricated in the manner of fabricating the optical recording medium sample #1 except that a water proof layer having a thickness of 90 nm was formed.

Then, an optical recording medium sample #4 was fabricated in the manner of fabricating the optical recording medium sample #1 except that a water proof layer having a thickness of 80 nm was formed.

Further, an optical recording medium comparative sample #1 was fabricated in the manner of fabricating the optical recording medium sample #1 except that no corrosion resistant layer was formed and a water proof layer having a thickness of 100 nm was formed.

Then, an optical recording medium comparative sample #2 was fabricated in the manner of fabricating the optical recording medium sample #1 except that a water proof layer was not formed.

The thicknesses of the water proof layer and the corrosion resistant layer of each sample are shown in Table 1.

TABLE 1

| | Water proof layer | Corrosion resistant layer |
|---|---|---|
| Sample #1 | 50 nm | 10 nm |
| Sample #2 | 50 nm | 20 nm |
| Sample #3 | 90 nm | 10 nm |
| Sample #4 | 80 nm | 20 nm |
| Comparative sample #1 | 100 nm | none |
| Comparative sample #2 | none | 10 nm |

Each of the optical recording medium sample #1, the optical recording medium sample #2, the optical recording medium sample #3, the optical recording medium sample #4, the optical recording medium comparative sample #1 and the optical recording medium comparative sample #2 was set in an optical recording medium evaluation apparatus "DDU1000" (Product Name) manufactured by Pulstec Industrial Co., Ltd. and a laser beam having a wavelength λ of 405 nm was focused onto each of the recording layers using an objective lens whose numerical aperture was 0.85 via the light transmission layer while each sample was rotated at a linear velocity of 5.3 m/sec, thereby recording random signals including 2T signals to 8T signals in the 1,7 RLL Modulation Code therein.

Then, signals recorded in each sample were reproduced and the error rate of the reproduced signal was measured. The error rate of the signal reproduced from each sample was found to be sufficiently low.

Further, each of the optical recording medium sample #1, the optical recording medium sample #2, the optical recording medium sample #3, the optical recording medium sample #4, the optical recording medium comparative sample #1 and the optical recording medium comparative sample #2 was subjected to a storage test in which it was held at a temperature of 80° C. and relative humidity of 80% for 50 hours. Following this test, the surface of each sample was visually observed.

No change was observed in the reflective layer of any of the optical recording medium sample #1, the optical recording medium sample #2, the optical recording medium sample #3, the optical recording medium sample #4 and the optical recording medium comparative sample #1, but the surface of the reflective layer of the optical recording medium comparative sample #2 was partially tarnished.

It is reasonable to conclude that this was because the optical recording medium comparative sample #2 was not provided with a water proof layer, so that the reflective layer was corroded by water passing through the support substrate.

Further, each of the optical recording medium sample #1, the optical recording medium sample #2, the optical recording medium sample #3, the optical recording medium sample #4, the optical recording medium comparative sample #1 and the optical recording medium comparative sample #2 subjected to the storage test was set in the above mentioned optical recording medium evaluation apparatus and, similarly to the above, random signals were recorded on a track of each sample on which random signals had been recorded earlier and the recorded random signals were overwritten.

Then, the newly recorded signals in each sample were reproduced and the error rate of the reproduced signal was measured.

The error rate of the signal reproduced from each of the optical recording medium sample #1, the optical recording medium sample #2, the optical recording medium sample #3 and the optical recording medium sample #4 was the substantially the same as that before the storage test. On the other hand, it was found that the error rate of the signal reproduced from each of the optical recording medium comparative sample #1 and the optical recording medium comparative sample #2 was markedly higher than that before the storage test.

It is reasonable to conclude that the error rate of the signal reproduced from the optical recording medium comparative sample #1 markedly increased in comparison with that before the storage test because the optical recording medium comparative sample #1 was not provided with a corrosion resistant layer and sulfur S contained in the water proof layer reacted with Ag contained in the reflective layer to form silver sulfide (AgS), whereby a part of the reflective layer peeled off.

Further, it is reasonable to conclude that the error rate of the signal reproduced from the optical recording medium comparative sample #2 markedly increased in comparison with that before the storage test because the optical recording medium comparative sample #2 was not provided with a water proof layer, so that the reflective layer was corroded by water passing through the support substrate.

The present invention has thus been shown and described with reference to specific embodiments and working examples. However, it should be noted that the present invention is in no way limited to the details of the described arrangements but changes and modifications may be made without departing from the scope of the appended claims.

For example, although the information recording layer 15 includes the second dielectric layer 23 constituted by the interface layer and the enhancing layer in the embodiment shown in FIGS. 1 to 3, it is not absolutely necessary to constitute the second dielectric layer 23 by the interface layer and the enhancing layer.

Further, in the embodiment shown in FIGS. 1, 2 and 4, although the recording layer 32 of the information recording layer 15 includes the first recording film 32a containing Si as a primary component and the second recording film 32b containing Cu as a primary component, it is sufficient for the first recording film 32a to contain one element selected from the group consisting of Si, Ge, Sn, Mg, In, Zn, Bi and Al as a primary component and for the second recording film 32b to contain one element selected from the group consisting of Cu, Al, Zn, Ti and Ag and different from the element contained in the first recording film as a primary component and it is not absolutely necessary for the recording layer 32 of the information recording layer 15 to include the first recording film 32a containing Si as a primary component and the second recording film 32b containing Cu as a primary component.

Furthermore, the information layer 15 is formed by laminating a first dielectric layer 21, a recording layer 22, a second dielectric layer 23 and a heat radiation layer 24 in this order from the side of the support substrate 11 in the embodiment shown in FIGS. 1 to 3 and the information recording layer 15 is constituted by laminating a second dielectric layer 31, a recording layer 32 and a first dielectric layer 33 in the embodiment shown in FIGS. 1, 2 and 4. However, in the present invention, the layer configuration of an information recording layer 15 is not limited.

According to the present invention, it is possible to provide a next-generation type optical recording medium which can effectively prevent a reflective layer from being corroded and has excellent storage reliability.

The invention claimed is:

1. An optical recording medium comprising a support substrate, a light transmission layer whose one surface constitutes a light incidence plane through which a laser beam is projected, an information recording layer formed between the support substrate and the light transmission layer, a reflective layer formed between the information recording layer and the support substrate, a water proof layer formed between the reflective layer and the support substrate and containing a mixture of ZnS and $SiO_2$ as a primary component, and a corrosion resistant layer formed between the water proof layer and the reflective layer, said corrosion resistant layer having ZnAl or $CeO_2$ as a primary component.

2. An optical recording medium in accordance with claim 1, wherein the reflective layer is formed of Ag or an alloy containing Ag as a primary component.

3. An optical recording medium in accordance with claim 2, wherein the reflective layer is formed of Ag or an alloy containing 95 atomic % or more of Ag.

4. An optical recording medium in accordance with claim 1, wherein the mixture of ZnS and $SiO_2$ for forming the water proof layer contains 95 mole % or more of ZnS and $SiO_2$.

5. An optical recording medium in accordance with claim 2, wherein the mixture of ZnS and $SiO_2$ for forming the water proof layer contains 95 mole % or more of ZnS and $SiO_2$.

6. An optical recording medium in accordance with claim 3, wherein the mixture of ZnS and $SiO_2$ for forming the water proof layer contains 95 mole % or more of ZnS and $SiO_2$.

7. An optical recording medium in accordance with claim 4, wherein the mole ratio of ZnS to $SiO_2$ in the mixture of ZnS and $SiO_2$ used contained in the water proof layer is 70:30 to 90:10.

8. An optical recording medium in accordance with claim 5, wherein the mole ratio of ZnS to $SiO_2$ in the mixture of ZnS and $SiO_2$ used contained in the water proof layer is 70:30 to 90:10.

9. An optical recording medium in accordance with claim 6, wherein the mole ratio of ZnS to $SiO_2$ in the mixture of ZnS and $SiO_2$ used contained in the water proof layer is 70:30 to 90:10.

10. An optical recording medium in accordance with claim 9, wherein the water proof layer has a thickness of 40 nm to 200 nm and the corrosion resistant layer has a thickness of 5 nm to 30 nm.

11. An optical recording medium in accordance with claim 7, wherein the water proof layer has a thickness of 40 nm to 200 nm and the corrosion resistant layer has a thickness of 5 nm to 30 nm.

12. An optical recording medium in accordance with claim 9, wherein the support substrate is formed of polycarbonate resin.

13. An optical recording medium in accordance with claim 7, wherein the support substrate is formed of polycarbonate resin.

14. An optical recording medium in accordance with claim 8, wherein the water proof layer has a thickness of 40 nm to 200 nm and the corrosion resistant layer has a thickness of 5 nm to 30 nm.

15. An optical recording medium in accordance with claim 8, wherein the support substrate is formed of polycarbonate resin.

16. An optical recording medium in accordance with claim 10, wherein the support substrate is formed of polycarbonate resin.

17. An optical recording medium in accordance with claim 11, wherein the support substrate is formed of polycarbonate resin.

18. An optical recording medium in accordance with claim 14, wherein the support substrate is formed of polycarbonate resin.

* * * * *